Figure 1:
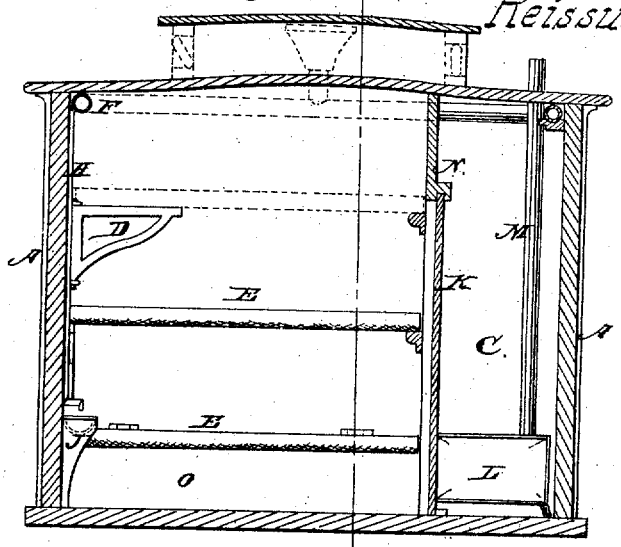
Figure 2:
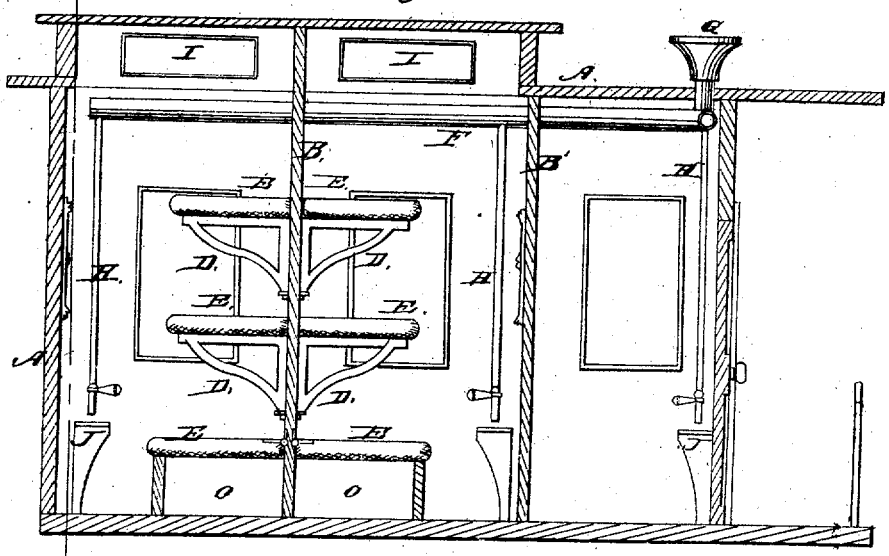

J. Swan.

Sleeping Car

No. 3,160.

Reissued Oct. 13 1868.

Witnesses.

A. M. Marr

V. D. Stockbridge

Inventor.

John Swan per

Hoyne & Thomas

Attys

UNITED STATES PATENT OFFICE.

JOHN SWAN, OF BALTIMORE, MARYLAND.

IMPROVED SLEEPING-CAR.

Specification forming part of Letters Patent No. 65,963, dated June 18, 1867; Reissue No. 3,160, dated October 13, 1868.

*To all whom it may concern:*

Be it known that I, JOHN SWAN, of Baltimore, in the county of Baltimore and State of Maryland, have invented certain new and useful Improvements in Sleeping-Cars; and I do hereby declare that the following is a full, clear, and exact description of the same, reference being had to the accompanying drawings, and to the letters of reference marked thereon.

In the annexed drawings, making part of this specification, A represents a car-body, which may be made in any of the known and usual ways, and supported upon the ordinary trucks. This car-body is provided with a partition, which runs longitudinally of it from near one end to near the other, being placed so as to form an aisle or passage-way between it and one side of the car-body. A series of partitions, B, run crosswise of the body, from the the partition N to the other side of said body, being about six feet six inches in length, thus forming a series of state-rooms, which are entered from the passage-way C through the doorways of the sliding doors K.

The doorways are formed in the partition N, and are provided with sliding doors K, so as not to obstruct the passage-way. Each state-room is made about forty-two inches in width, and within each of said rooms are placed three beds, at suitable distances one above the other. These beds are made twenty-eight inches wide, leaving a space between their outer edge and the partition next to them of fourteen inches. The lower bed is hinged upon and forms the cover to a box, O.

D D represent hinged brackets, which support the upper beds. During the day-time, when the second and third beds are not in use, their brackets are turned to one side, and they fall down on hinges against the wall and form a cushioned back for the seat. The brackets can be swung around so that they will lie against the cross-partitions when the beds are not being used.

F represents a reservoir or pipe, which runs around the top of the car on its inside, which is intended for holding water. This pipe is made large enough to contain about nine gallons of water for each state-room, and is provided with a funnel, as seen at G, through which it may be supplied with water at any of the usual tanks. A pipe, H, which is provided with a stop-cock, passes down from the reservoir F into each state-room and supplies water to the basins J J.

L represents a stove, and M its pipe, said stove being placed in the passage-way for the purpose of warming the car in cold weather.

A water-closet or privy may be made at each end of the car, one for the accommodation of ladies, and the other for gentlemen.

Each state-room has its ventilating-window I, and each its looking-glass, clothes-rack, basin, and water-cooler.

One great advantage in arranging a sleeping-car in this manner is that each state-room is separate and distinct, having its own door, to be opened at pleasure, and having its own ventilation. A party of gentlemen occupying one of these rooms can smoke or drink their wine or eat their meals without inconveniencing or annoying others, and with perfect privacy.

Another advantage is water is supplied to each room, so that its occupants can perform their ablutions in the morning, or be supplied with water, when necessary, during the day without the great inconvenience of staggering from their seats to the end of the car to find a water tank or cooler.

Another advantage is that, the beds being placed crosswise of the body of the car, the occupants are not rolled about or jostled by the sidewise movement so incident or common in cars passing around curves or over small obstructions upon the track, and are thus enabled to rest with more ease and comfort and more safety, as they are not over the rails, but in the center of the track.

Two state-rooms may sometimes be formed in one to accommodate families.

Sleeping-cars may be made cheaper by my plan than they can be by the modes now usually adopted.

Ventilation may be had from the passage beneath each seat or lower bed through gauze-wire windows in the partition and side of the car, and the heat from the stove may be conducted beneath each state-room in suitable pipes and admitted to the rooms by suitable registers.

Having thus fully described my invention, what I claim as new, and desire to secure by Letters Patent, is—

1. A series of state-rooms made crosswise of the car and provided with a side passage and independent ventilation, substantially as and for the purpose set forth.

2. The reservoir F, pipes H H, and basins J J, for supplying water to the state-rooms, substantially as specified.

3. The side passage C, when used in combination with a series of cross-berths or state-rooms, as and for the purpose set forth.

In testimony that I claim the foregoing I have hereunto set my hand this 29th day of August, 1867.

JNO. SWAN.

Witnesses:
E. G. HALL,
JNO. E. HOWARD.